United States Patent [19]

Tanaka et al.

[11] 4,103,967
[45] Aug. 1, 1978

[54] ROLLER SEAT BACK LATCH MECHANISM

[75] Inventors: Akira Tanaka, Northridge; William M. Hollowell, Pacific Palisades, both of Calif.

[73] Assignee: American Safety Equipment Corporation, Los Angeles, Calif.

[21] Appl. No.: 750,178

[22] Filed: Dec. 13, 1976

[51] Int. Cl.² ............................................. B60M 1/02
[52] U.S. Cl. ................................... 297/216; 297/379
[58] Field of Search ...................... 297/216, 378, 379; 16/144, 139; 292/DIG. 22

[56] References Cited

U.S. PATENT DOCUMENTS

| | | | |
|---|---|---|---|
| 2,873,794 | 2/1959 | Leslie et al. | 297/379 |
| 4,010,979 | 3/1977 | Fisher et al. | 297/379 |

Primary Examiner—Roy D. Frazier
Assistant Examiner—William E. Lyddane
Attorney, Agent, or Firm—Poms, Smith, Lande & Glenny

[57] ABSTRACT

An inertia-responsive vehicle seat back latch mechanism for a vehicle seat assembly having a seat back pivotally supported for forwardly tilting movement, wherein said latch mechanism includes an unattached, inertia-responsive mass which moves in response to changes in vehicle velocity such that it is disposed in a position to engage a latch and thereby prevent forward tilting of the seat back. In the preferred embodiment of this invention, the unattached, inertia-responsive mass is a roller contained within a roller guide.

18 Claims, 16 Drawing Figures

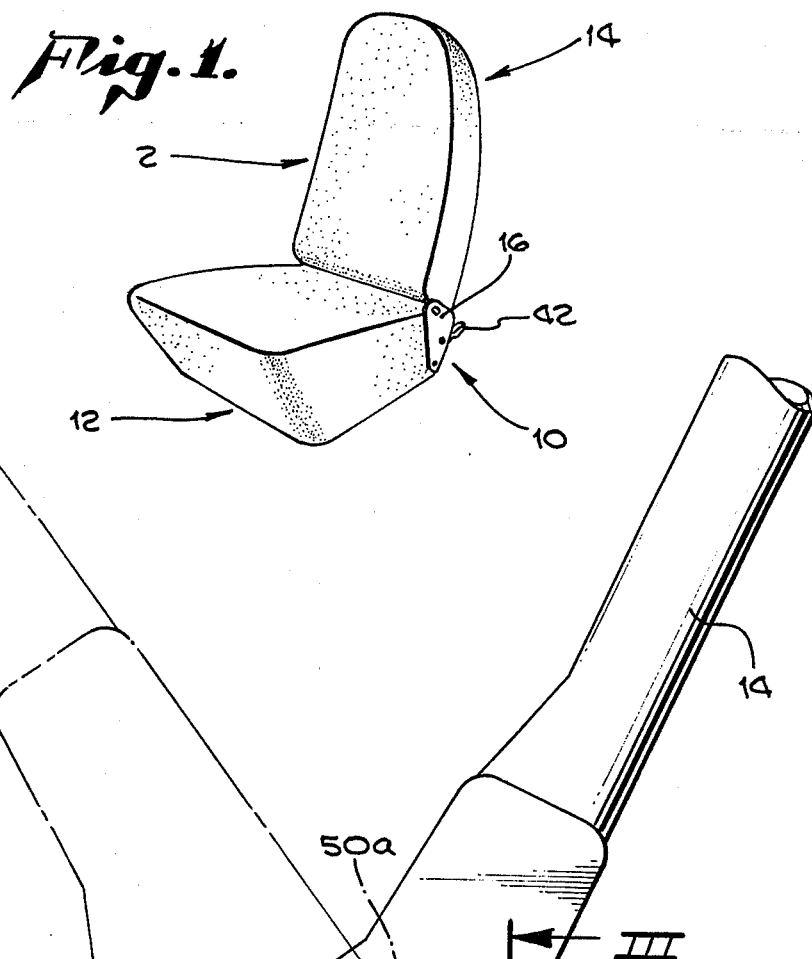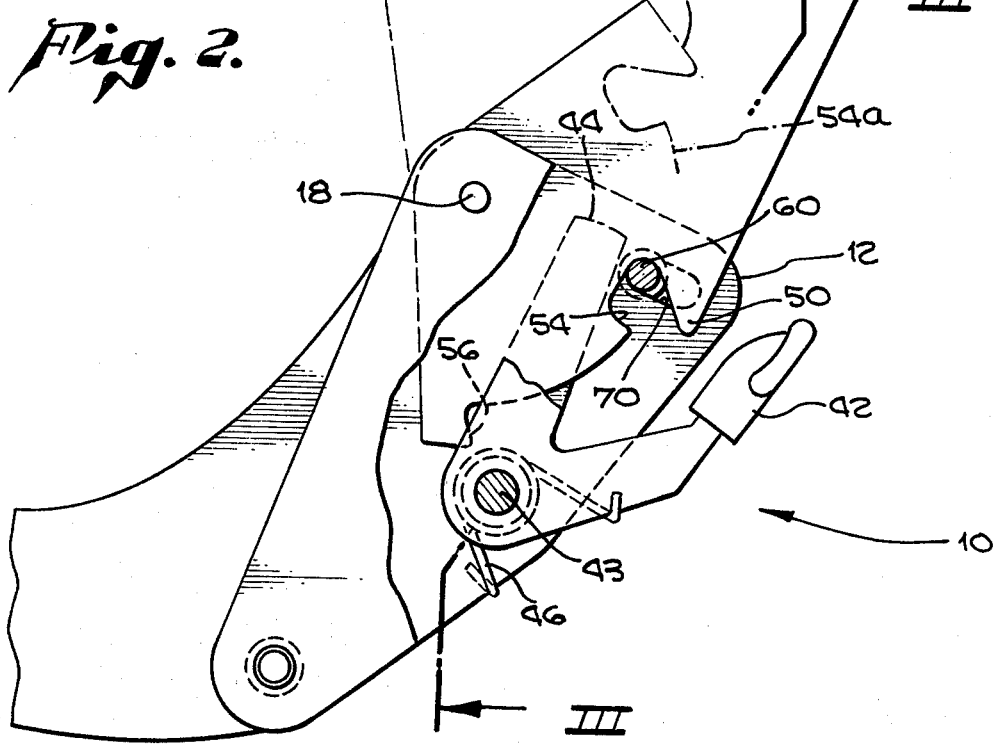

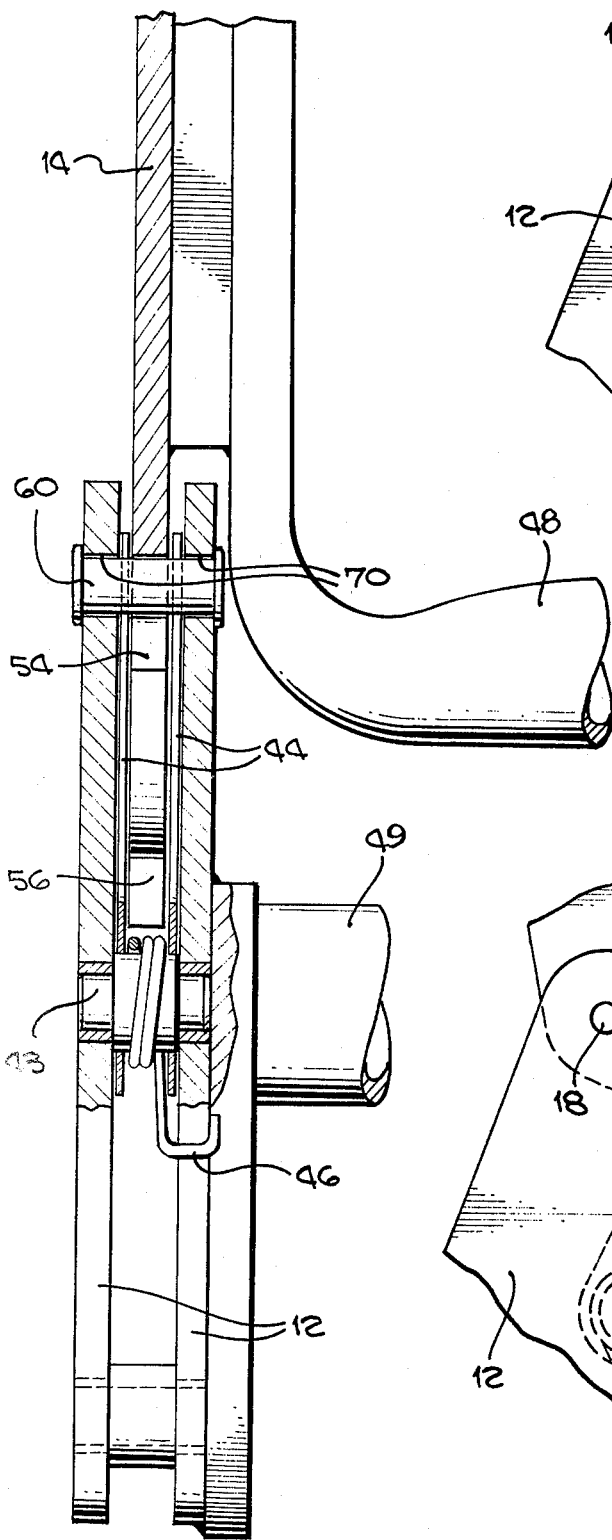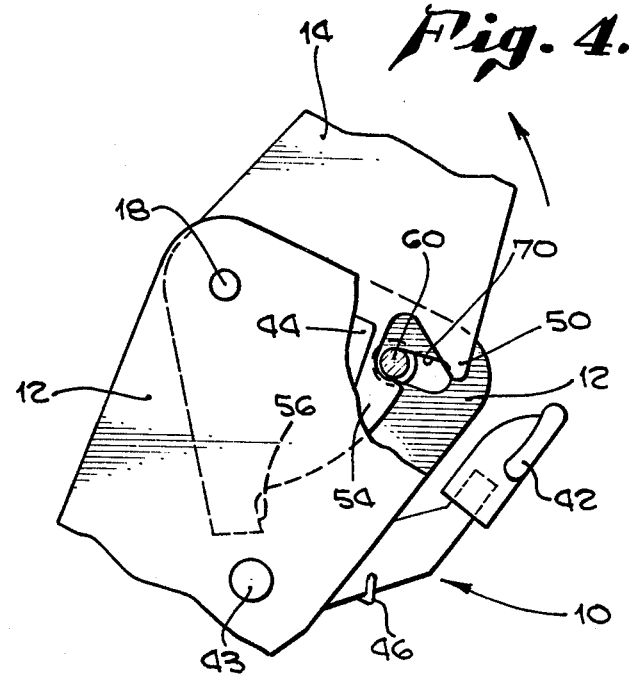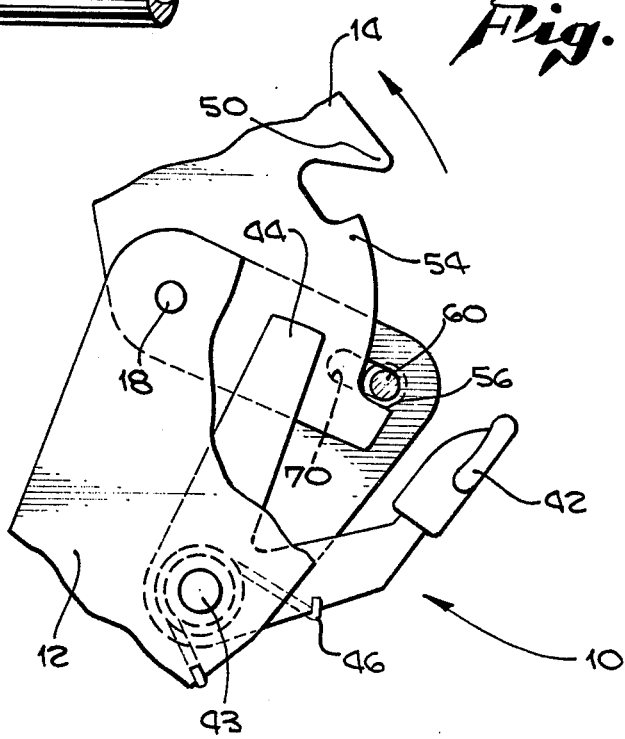

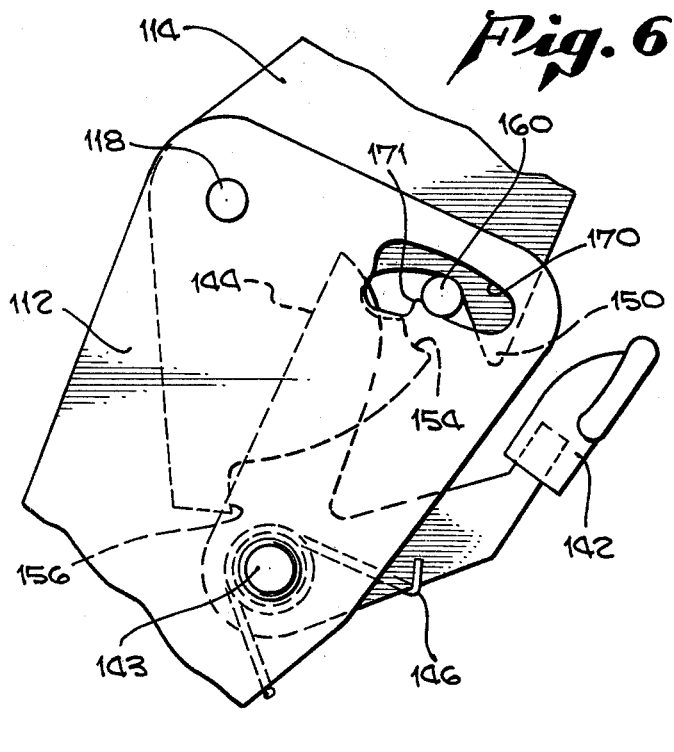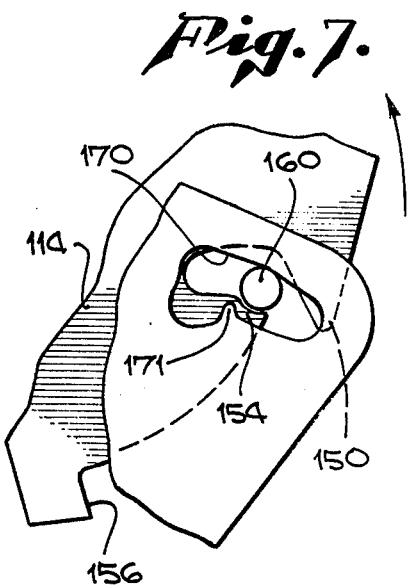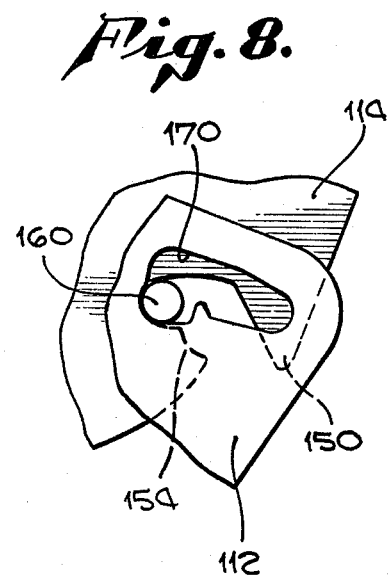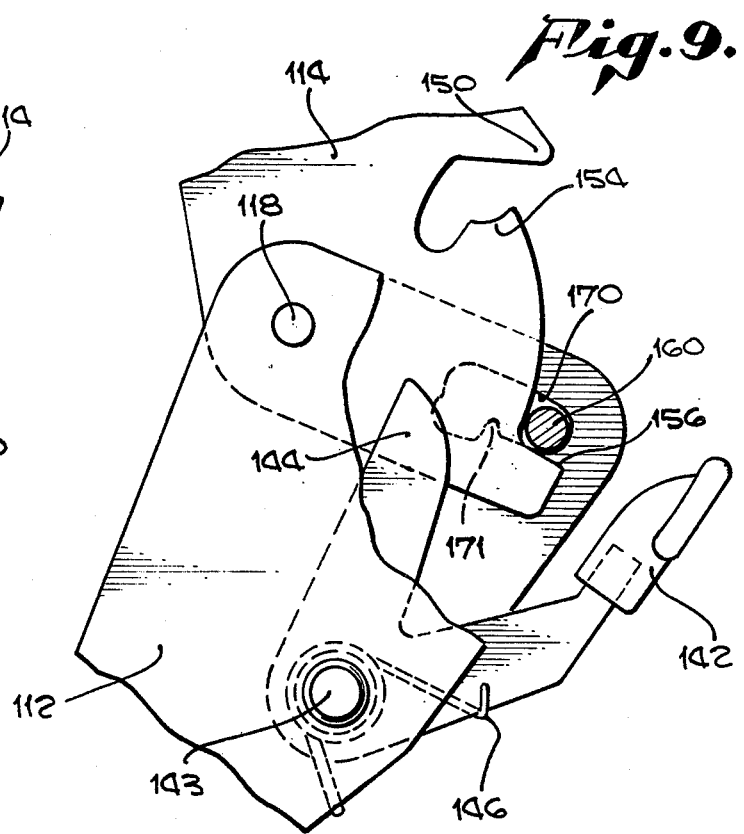

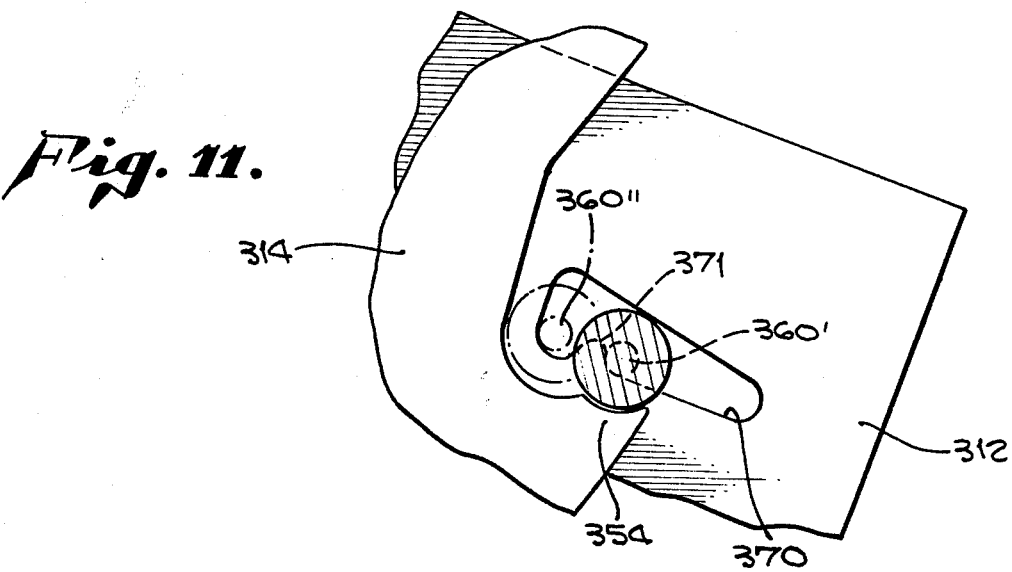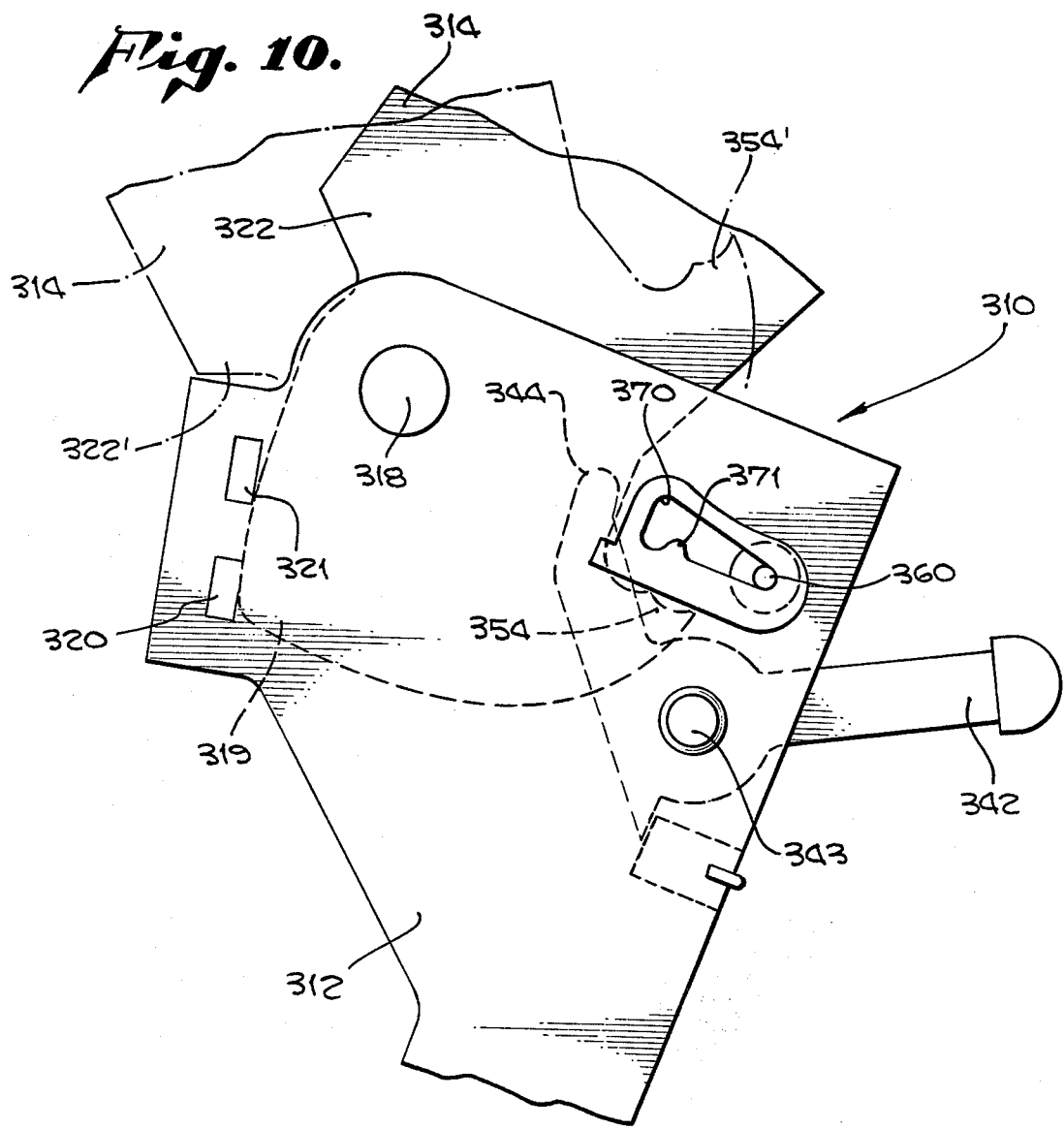

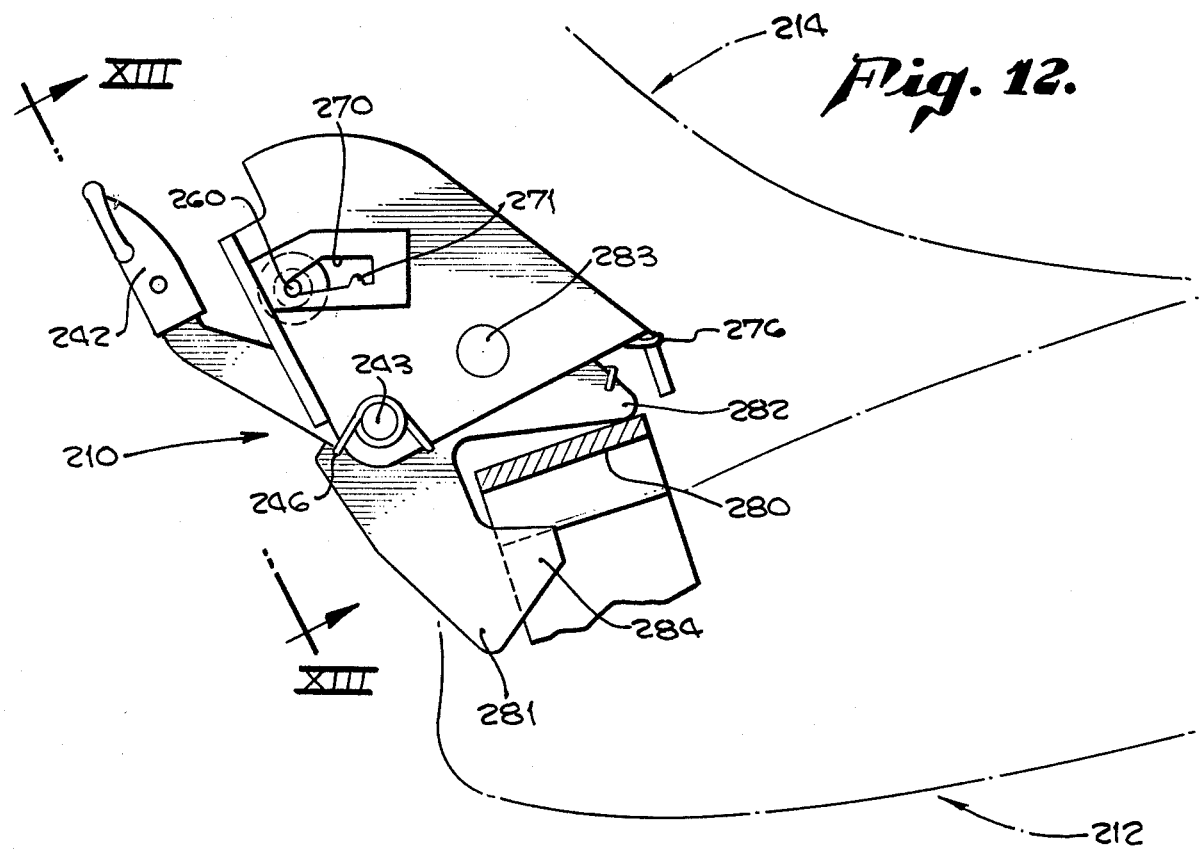
Fig. 12.
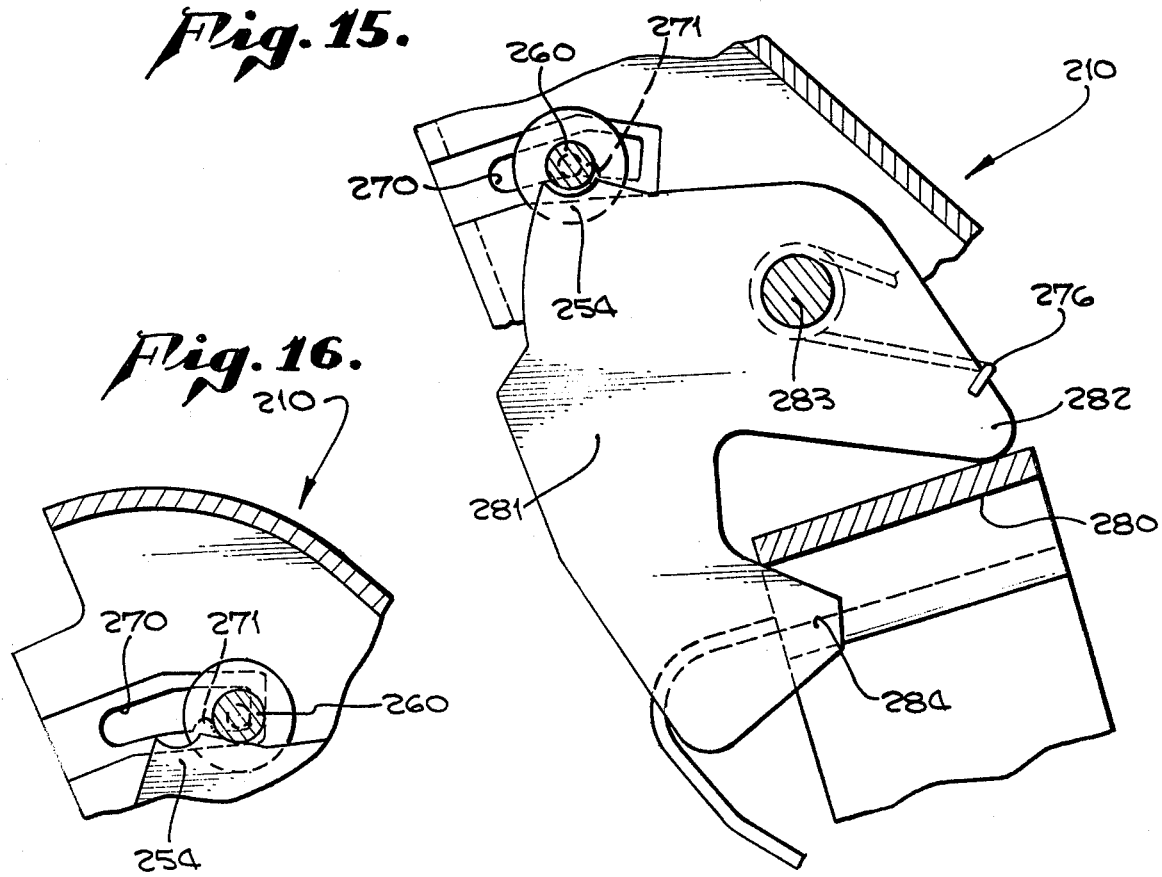
Fig. 15.
Fig. 16.

ROLLER SEAT BACK LATCH MECHANISM

BACKGROUND OF THE INVENTION

1. Field of the Invention

This invention relates to vehicle seat back latch mechanisms, particularly to inertia-responsive, seat back latch mechanisms, and more particularly to vehicle-sensitive, inertia-responsive seat back latch mechanisms.

2. Description of the Prior Art

The prior art discloses the exploitation of inertia and gravity to provide latching mechanisms for vehicle seat backs. However, none of these prior art mechanisms employs an unattached, inertia-responsive mass, nor do they provide a latching mechanism which will permanently lock the vehicle seat to prevent tilting of the seat back subsequent to the deceleration of the vehicle.

While all prior art inertia-responsive mechanisms will lock a seat back and prevent forward tilting of the seat back during a sudden deceleration, such as is experienced during a frontal crash, they are inoperative when deceleration is no longer occurring. Because all seat backs will exhibit some flexibility during a frontal crash, the locked seat back will flex forward during the first stage of the crash, thereby absorbing energy. During the intermediate stage of the crash, the seat back will then flex back, through its original position, and beyond to a new back, flexed position. At this stage of the crash, the vehicle has stopped decelerating or is slowly decelerating. Now the seat back, in its back flexed position, flies forward again, but because the vehicle is no longer quickly decelerating, the latching mechanism will not prevent the seat back from moving to its fully forward position. This is known as seat back rebound, and results in serious passenger injuries notwithstanding the presence of conventional seat back latch mechanisms.

It is, therefore, a primary object of this invention to provide a new vehicle-sensitive, inertia-responsive seat back latch mechanism.

Yet another object of this invention is to provide a new seat back latch mechanism which will prevent seat back rebound.

Yet another object of this invention is to provide a new seat back latch mechanism which employs an unattached, inertia-responsive mass.

SUMMARY OF THE INVENTION

Briefly, these and other objects of the invention are provided for by an inertia-responsive vehicle seat back latch mechanism for a vehicle seat assembly having a seat back pivotally supported for forwardly tilted movement, the latch mechanism including an unattached inertia-responsive member adapted to move in a restricted path, and be in a seat back locking position during a vehicle deceleration, and a means for containing the movement of said unattached inertia-responsive member in said restricted path. This latch mechanism may also include a means for maintaining said inertia-responsive member in its seat back locking position subsequent to a vehicle deceleration. In particular this seat back latch mechanism includes a roller guide means attached to said vehicle seat assembly for guiding an unattached inertia-responsive roller means within a restricted path of movement and biasing said roller means to a seat back tilting position, and unattached inertia-responsive roller means contained within said guide means for being disposed in a seat back locking position during a vehicle deceleration greater than a first predetermined value, and a latch attached to said vehicle seat assembly and adapted to cooperate with said roller means in the seat back locking position to cause the seat back to be in a locked condition.

In one preferred embodiment, the roller guide has provided for it a small barrier over which the roller may move when the vehicle experiences a deceleration greater than a second predetermined value. When the roller moves beyond this barrier, it is prevented by the barrier from moving back down to the position allowing the seat back to tilt forward, thereby preventing the forward tilting of the seat back subsequent to said vehicle deceleration and preventing seat back rebound. This seat back latch mechanism will also be provided with a release lever to reposition the roller in its normal seat back tilting position within the roller guide.

In a second preferred embodiment of the seat back latch mechanism of this invention, the seat back is provided with a camming surface which engages the roller and maintains the roller in the seat back locking position when the seat back is in its normal upright position. However, when the seat back is tilted forward at a moderate rate during a condition of no or little deceleration the roller will roll down to the seat back tilting position thereby preventing the latch from locking with the roller. However, during a condition of vehicle deceleration greater than a predetermined value, the roller will, due to inertia, remain in its seat back locking position and thereby, engage the latch and prevent the seat back from tilting forward. This embodiment may also provide the roller guide with a barrier in the seat back locking position such that the roller may move past this barrier during a vehicle deceleration greater than a second predetermined value. As described above, this barrier will thereby maintain the roller in the seat back locking position subsequent to said vehicle deceleration and maintain the seat back in a locked condition. Again, this embodiment may be provided with a release lever to return the roller to its normal position.

These and other objects and features of the present invention will become apparent to those skilled in the art by reference to the following description and drawings.

BRIEF DESCRIPTION OF THE DRAWINGS

FIG. 1 is a perspective view of a vehicle seat assembly;

FIG. 2 is a partial, side-elevational view showing one embodiment of the seat back latch mechanism of this invention, including a partial phantom view;

FIG. 3 is a back-elevational view of the embodiment shown in FIG. 2 taken along the line III—III;

FIG. 4 is a partial, side-elevational view of the embodiment shown in FIG. 2 wherein the seat back is being prevented from tilting forward;

FIG. 5 is a partial, side-elevational view of the seat back latch mechanism shown in FIG. 2 wherein the mechanism has allowed the seat back to tilt forward;

FIG. 6 is a preferred embodiment of the seat back latch mechanism shown in FIG. 2;

FIG. 7 is a partial, side-elevational view of the embodiment shown in FIG. 6 wherein the seat back is being prevented from tilting forward;

FIG. 8 is a partial, side-elevational view of the seat back latch mechanism shown in FIG. 6, wherein the seat back is being maintained in a locked condition;

FIG. 9 is a partial, side-elevational view of the embodiment shown in FIG. 6, wherein the seat back has tilted forward, and also showing a release lever for releasing the seat back latch mechanism;

FIG. 10 is a partial, side-elevational view of still another embodiment of the seat back latch mechanism of this invention;

FIG. 11 is a partial, side-elevational view of the embodiment shown in FIG. 10 wherein the seat back latch mechanism is shown causing the seat back to be in a locked condition; and also, in phantom, showing the seat back being maintained in a locked condition;

FIG. 12 is a partial, side-elevational view showing another embodiment of the seat back latch mechanism of this invention;

FIG. 15 is a partial, side-elevational view of the embodiment shown in FIG. 12 wherein the seat back is in a locked condition; and FIG. 16 is a partial, side-elevational view of the embodiment shown in FIG. 12 wherein the seat back is being maintained in a locked condition.

DETAILED DESCRIPTION OF THE INVENTION

Figure 14:
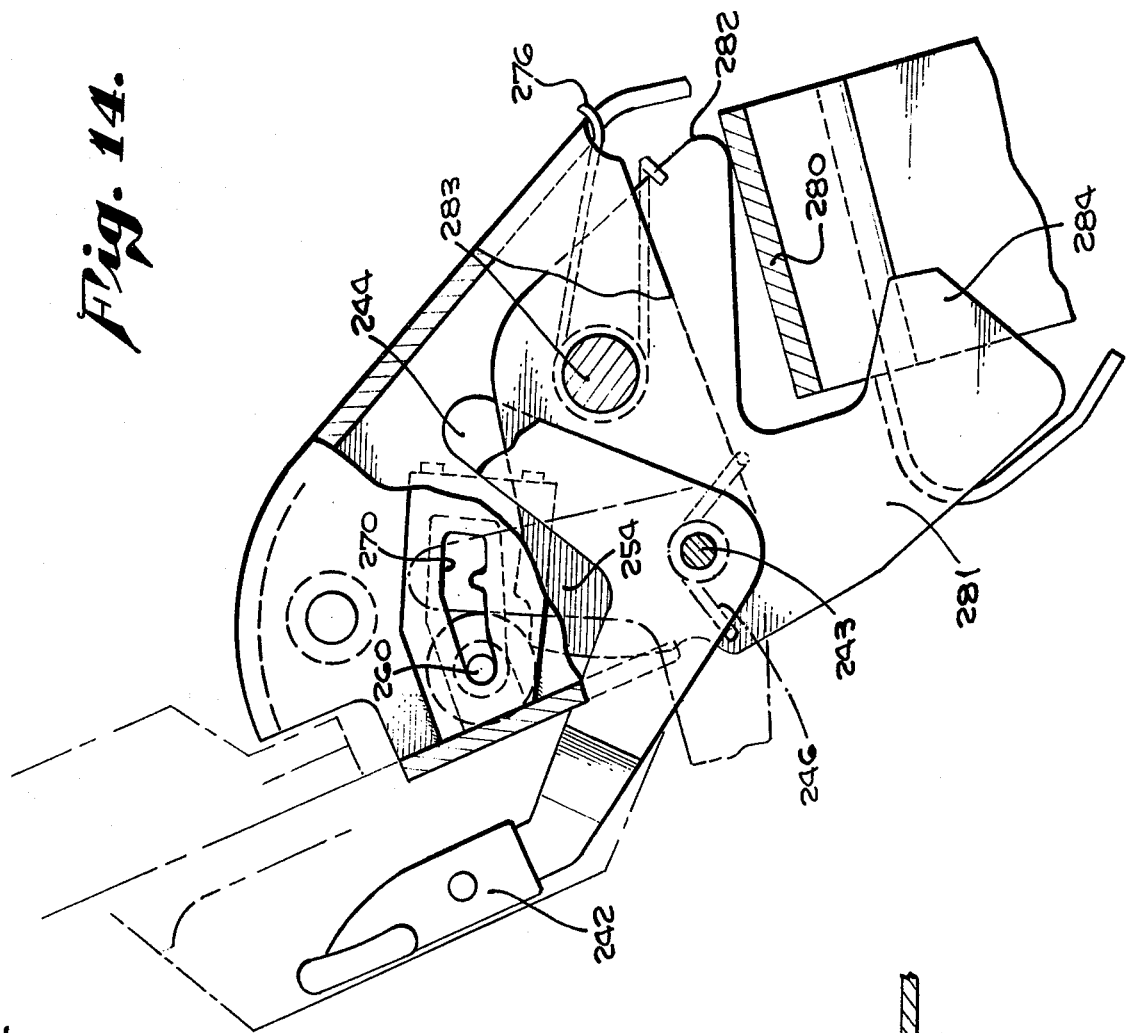
FIG. 14 is a side-elevational view of the embodiment shown in FIG. 13, taken along the line XIV—XIV.

Referring now to FIG. 1 of the drawings, there is shown a vehicle seat assembly 2, having a seat back 14 covered by upholstery and a seat cushion support 12, also covered by upholstery. There is also generally shown a seat back latch mechanism 10 having a cover plate 16 and a release lever 42. The seat back latch mechanism of this invention may be used on bucket seats as shown in FIG. 1, as well as with bench-type seats, and may be structurally positioned on the outer edges of a seat assembly or positioned in the middle sections of a seat assembly.

FIRST EMBODIMENT

Referring now to FIGS. 2 through 9, there is shown the first embodiment of this invention. Referring specifically to FIG. 2, seat back 14 is pivotally supported about seat cushion support 12 by means of seat back pivot 18. Seat back 14 is adapted to normally be in a relatively vertical position, as shown in FIG. 1 and FIG. 2.

Seat cushion support 12 is provided with an unattached, inertia-responsive roller 60 which is contained by and guided by roller guide 70. Roller guide 70 and roller 60 are so structured as to allow the roller to move freely in a forward and back direction in response to changes in the velocity of the vehicle, but also to contain the roller within the guide 70, which conveniently may be a slot. Seat back 14 has associated with it a camming portion 50, a seat back locking portion 54, and a seat back stopping portion 56. As shown in FIG. 2, when seat back 14 is in its normal vertical position, seat back camming portion 50 cams roller 60 into an up position. Roller guide 70 is structurally adapted so as to bias roller 60 into a down position. This is accomplished by making roller guide 70 an upperly inclined slot, whereby gravity biases roller 60 downwardly. When seat back 14 is slowly tilted forward during conditions of relatively stable velocity, camming portion 50 rotates away from roller 60 and thereby allows roller 60 to move down roller guide 70. As seat back 14 is tilted forward, as shown in phantom views 14a and 50a, seat back locking portion 54 rotates counterclockwise, in FIG. 2, and bypasses roller 60 which has moved down roller guide 70. As seat back 14 is further tilted forward, seat back stopping portion 56 will rotate into abutting engagement with roller 60 and thereby prevent further tilting of seat back 14.

During vehicle deceleration, such as during a deceleration caused by rapid braking or a frontal crash, the inertia-responsive roller 60 will be held in its up position by inertia and thereby be in a position to abuttingly engage seat back locking portion 54 to prevent tilting of seat back 14. Roller 60 and roller guide 70 are preferably structurally adapted so that roller 60 remains in the seat back locking position only in response to a vehicle deceleration greater than a first predetermined value. For example, the incline in roller guide 70 can be structured so that only during a vehicle deceleration greater than 0.05G will roller 60 remain in its seat back locking position. In such a construction, during vehicle decelerations equal to or less than 0.5G, roller 60 will move down roller guide 70, thereby allowing seat back 14 to tilt forward.

The seat back latch mechanism of this embodiment functions in a second way. Even during periods of constant velocity, or during periods of small changes in velocity, should seat back 14 be tilted forward too quickly, roller 60 will not move down roller guide 70 fast enough to avoid seat back locking portion 54 being rotated into abutting relationship with roller 60. This will result in seat back 14 being prevented from being tilted forward too quickly. Roller 60 and roller guide 70 can be structurally adapted to prevent the quick tilting of seat back 14 for a predetermined value of angular velocity. This feature of this embodiment will also prevent seat back rebound when the seat back attempts to fly forward while the vehicle itself is stationary.

Seat back latch mechanism 10 is also provided with a release lever 42 which pivots about release lever pivot 43, a release arm 44, which is biased in a counterclockwise direction by release lever spring 46. In FIG. 2, the release lever 42 can be pulled down in a clockwise direction thereby causing release arm 44 to push roller 60 and force it into the down, seat back tilting position. Release lever 42 is desirable in situations wherein the car has been turned over on its side thereby causing roller 60 to be disposed in a seat back locking position, requiring the use of a release lever.

Referring now to FIG. 3, there is shown a back-elevational view of the seat back latch mechanism of FIG. 2, taken along the line III—III. Seat back 14 and seat cushion support 12 are connected to transverse seat back supports 48 and 49 which provide structural support to the seat back.

Referring now to FIGS. 4 and 5, there is shown the position of seat back 14 in the seat back lock position and in its full forward tilting position, respectively. In FIG. 4, seat back locking portion 54 is shown in abutting relationship with roller 60, thereby preventing tilting of seat back 14. In FIG. 5, roller 60 has moved down roller guide 70 to the seat back tilting position, thereby allowing seat back 14 to tilt forward, and shows seat back stopping portion 56 abutting roller 60 preventing further tilting of seat back 14.

FIGS. 6–9 show a preferred embodiment of the seat back latch mechanism shown in FIG. 2. The seat back latch mechanism is modified by providing a means for maintaining the seat back in a locked condition subsequent to a vehicle deceleration. This modification is provided for in roller guide 170 by the provision of barrier 171. Referring to FIG. 8, the seat back latch mechanism operates in the same manner as the seat back latch mechanism shown in FIG. 2, with the exception that during a vehicle deceleration, such as a vehicle deceleration greater than some second predetermined value (e.g., 5.0G), the unattached, inertia-responsive roller 170 will move over barrier 171 and into a position not allowing roller 170 to move back into its normal position as shown in FIG. 6. During a vehicle deceleration less than 5.0G, for example, the roller 170 will merely abut barrier 171 and thereby allow the seat back latch mechanism to function in a conventional manner, as described with respect to FIGS. 2–5.

Referring now to FIG. 7, the vehicle is experiencing a deceleration causing seat back 114 to tilt forward in the direction of the arrow; however, because the vehicle deceleration is less than a second predetermined value (e.g., 5.0G), roller 160 only moves up to barrier 171 and is positioned for abutting engagement with seat back locking portion 154. In this position, roller 160 will allow seat back 114 to be tilted forward subsequent to the vehicle deceleration.

Referring now to FIG. 9, seat back 114 is shown in its forward tilted position, as indicated by the arrow, and roller 160 is shown in the seat back tilting position, having rolled into this position upon the release of seat back camming portion 150.

Referring again to FIG. 6, there is shown a release lever 142 pivoted about release lever pivot 143 and having a release arm 144. The release lever is spring biased about its pivot 143 by release lever spring 146. By pulling release lever 142 in a clockwise direction, release arm 144 can move roller 160 out from its maintained seat back locking position and back into its normal position as shown in FIG. 6.

Referring now to FIGS. 10 and 11, there is shown a modification of the first embodiment of the seat back latch mechanism of this invention. This embodiment is similar to the seat back latch mechanism shown in FIGS. 6 through 9, except that seat back camming portion 150 has been removed thereby allowing roller 360 to normally be in the position shown in FIG. 10 which position allows the seat back 314 to tilt forward. Seat back 314 pivots about seat back pivot 318 and pivots between its normal upright position and a forward tilting position. Seat back stop 320 abuts portion 319 of seat back 314 to limit the backward movement of the seat back 314 and seat back stop 321 is adapted to abut portion 322 of seat back 314 to limit the maximum forward movement of seat back 314.

Roller guide 370 is contained within and attached to seat cushion support 312. Contained within roller guide 370 is roller 360 which is an unattached, inertia-responsive roller which is free to move within roller guide 370 in response to changes in vehicle velocity. Roller guide 370 is preferably provided with a barrier 371 which selectively limits the forward movement of roller 360. During a vehicle deceleration greater than a first preselected value, such as 0.5G, and less than a second preselected value such as 5.0G, roller 360 will move up the incline of roller guide 370 and abut barrier 371. When roller 360 is in this position, seat back locking position 354 of seat back 314 is adapted to engage the roller and thereby prevent forward tilting of seat back 314. Subsequent to said change in vehicle deceleration roller 360 is able to move down the incline of roller guide 370 and thereafter allow seat back 314 to tilt forward. This position of roller 360 and the engagement of seat back locking portion 354 is shown in FIG. 11 as 360'.

During a vehicle deceleration greater than a second preselected value, such as 5.0G, roller 360 is able to move over barrier 371 and move into the position shown in FIG. 11 as 360''. This position also allows seat back locking portion 354 to engage roller 360 to prevent the forward tilting of seat back 314 and in addition does not allow roller 360 to move down to its original position subsequent to said vehicle deceleration. Barrier 371 thereby maintains the seat back in a locked condition subsequent to a vehicle deceleration greater than said second preselected value.

Seat back latch mechanism 310 is provided with release lever 342 which is attached to seat cushion support 312 and pivoted about release lever pivot 343. Release lever 342 is provided with release arm 344 which is adapted, upon moving release lever 342 downwardly to move roller 360 from position 360'' and back into its original position shown in FIG. 10.

SECOND EMBODIMENT

Referring now to FIGS. 12 through 16, there is shown a second embodiment of the seat back latch mechanism of this invention adapted for use on a bucket seat wherein the seat back 214 pivots about a pivot (not shown) in the front of seat cushion support. The seat back 214 pivots about an axis displaced from the lock engagement point. This axis is generally located about midway fore and aft on the seat cushion support 212 which in turn is affixed to the vehicle. The seat back 214 tilts forward independently of the seat cushion support 217. While this may be a preferred use for this embodiment of the seat back latch mechanism, it is only necessary for its operation that the seat back tilt about a pivot located forwardly of the seat back latch mechanism 210.

Referring now to FIG. 12, there is shown a side-elevational view of the seat back latch mechanism 210 of this embodiment, wherein there is shown in phantom seat back 214 and seat cushion support 212, which in this embodiment are rigidly attached to one another. Seat back latch mechanism 210 is shown attached to seat back 214. Seat back latch mechanism 210 is provided with roller guide 270 and unattached, inertia-responsive roller 260 which is structurally adapted to be contained within said roller and be free to respond to changes in vehicle velocity. Seat back latch mechanism 210 is also provided with a latch 281 having a camming portion 282 and a latching portion 284. Latch 281 also has an engaging portion 254 which is not seen in FIG. 12.

The vehicle seat assembly is also provided with a catch 280 which is fixedly attached to the floor of the vehicle and which, therefore, does not tilt forward with the seat back and seat cushion support. Catch 280 provides a top surface upon which camming portion 282 cams upon and a bottom portion with which latching portion 284 may latch and prevent the further tilting forward of seat back 214. Latch 281 pivots about pivot 283 and is biased in a clockwise direction by latch spring 276, shown in FIG. 14.

Figure 13:
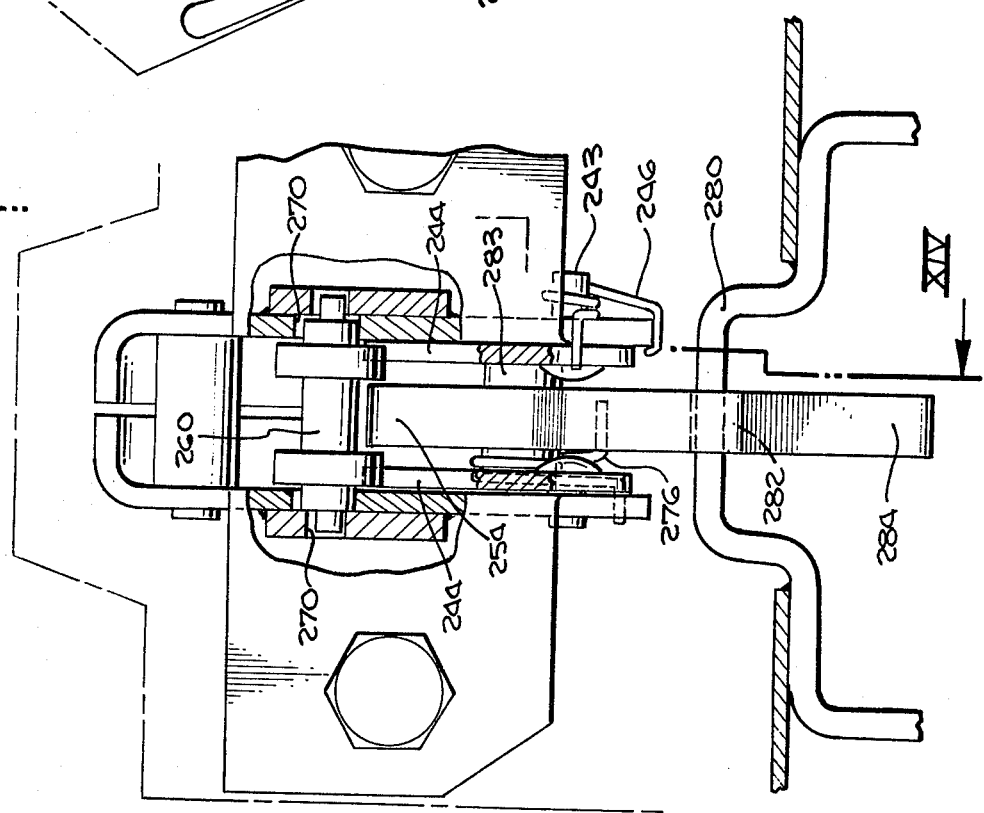
FIG. 13 is a back-elevational view of the embodiment shown in FIG. 12, taken along the line XIII—XIII.

Referring now to FIG. 13, there is shown a back-elevational view of the seat back latch mechanism as shown in FIG. 12, taken along the line XIII—XIII and detailing in particular the structure of catch 280.

Referring now to FIG. 15, there is shown a partial, side-elevational view of seat back latch mechanism 210 shown in FIG. 12, wherein the vehicle has experienced a deceleration greater than a first value, such as 0.5G, such that roller 260 has moved to a first position, abutting barrier 271. Now, as seat back 214 is tilted forward, seat back latch mechanism 210 also is tilted forward thereby raising latch 281 upwardly from catch 280. Because latch 281 is originally in the position shown in FIG. 12 wherein latching portion 284 is underneath and received by the opening under catch 280, and because latch 281 is spring biased in a clockwise direction, as latch 281 is lifted upwardly and tilted forward latching portion 284 begins to recede from under catch 280. However, because roller 260 is in its seat back locking position, engaging portion 254 of latch 281 engages roller 260 and prevents latch 281 from rotating clockwise any further and thereby prevents latching portion 284 from moving from underneath catch 280. Because latching portion 284 is held by roller 260 underneath catch 280, latching portion 284 is caught by catch 280 and thereby prevents seat back 214 from tilting forward. During a vehicle deceleration less than a first predetermined value, such as less than 0.5G, roller 260 remains in its original position and thereby allows engaging portion 254 to bypass roller 260 and thereby allows latch 281 to rotate clockwise and thereby move latching portion 284 from underneath catch 280. This allows the seat back to tilt completely forward.

Referring now to FIG. 16, there is shown a portion of seat back latch mechanism 210 wherein the vehicle has a deceleration greater than a second predetermined value, such as greater than 5.0G. A vehicle deceleration greater than said second preselected value causes roller 260 to overcome barrier 271 and come to rest in a seat back locking position such that roller 260 is prevented from returning to its original position and thereby maintains the seat back in a locked condition. While roller 260 is in this maintained seat back locking position engaging portion 254 will engage roller 260 and prevent seat back 214 from tilting forward subsequent to the vehicle deceleration.

Referring to FIG. 14, because roller 260 is adapted to be positioned in a maintained seat back locking position above barrier 271 a means is required to release said roller. This means is provided for by a release lever 242 which is attached to the seat back latch mechanism 210 and pivots about pivot 243, and which has a release lever spring 246 which biases the release lever 242 in a clockwise direction. Release lever 242 also has release arm 244 which actually contacts and releases roller 260 from its maintained locking position when release lever 242 is pulled down in a counterclockwise direction.

While there have been shown and described what is at present considered to be the preferred embodiment of the invention, it is obvious to those skilled in the art that various changes and modifications can be made therein without departing from the invention as defined by the appended claims.

We claim:

1. An inertia-responsive vehicle seat back latch mechanism for a vehicle seat assembly having a seat cushion support, and a seat back pivotally supported for forwardly tilting movement, said latch mechanism comprising:

forwardly-inclined roller guide means adapted for attachment to the vehicle seat assembly for guiding a roller means;

roller means contained within said guide means for moving between a seat back locking position and a seat back tilting position, said roller guide means being adapted so that during a vehicle deceleration greater than a first predetermined value, the roller means is positioned in the seat back locking position; and latching means adapted to be attached to the seat back assembly for direct engagement with said roller means when said roller means is in its seat back locking position to prevent said seat back from tilting forward.

2. The latch mechanism defined in claim 1 wherein said latch mechanism includes a means for maintaining said roller means in said seat back locking position subsequent to a vehicle deceleration greater than a second predetermined value, which value is greater than said first value.

3. The latch mechanism defined in claim 2 further including means for releasing said maintaining means to allow said seat back to be tilted forward.

4. An inertia-responsive vehicle seat back latch mechanism for a vehicle seat assembly having a seat cushion support, and a seat back pivotally supported for forwardly tilting movement, said latch mechanism comprising:

forwardly-inclined roller guide means attached to the vehicle seat assembly for guiding an unattached inertia-responsive roller means within a restricted path of movement and which roller means is initially in a seat back tilting position;

unattached inertia-responsive roller means contained within said guide means for moving from said seat back tilting position to a seat back locking position during a vehicle deceleration greater than a first predetermined value; and a latch attached to the vehicle seat assembly and adapted to directly engage said roller means in the seat back locking position to cause the seat back to be in a locked condition.

5. The latch mechanism defined in claim 4, wherein said latch mechanism includes a means for maintaining said roller means in said seat back locking position subsequent to a vehicle deceleration greater than a second predetermined value, which value is greater than said first value.

6. The latch mechanism defined in claim 5 further including means for releasing said maintaining means to cause said seat back to be in an unlocked condition.

7. An inertia-responsive vehicle seat back latch mechanism for a vehicle seat assembly having a seat cushion support, and a seat back pivotally supported for forwardly tilting movement, said latch mechanism comprising:

forwardly-inclined roller guide means attached to the seat back for guiding an unattached, inertia-responsive roller means in a restricted path of movement and which roller means is initially in a first position allowing tilting of said seat back;

unattached, inertia-responsive roller means contained within said guide means for moving from said first position to a second locking position during a vehicle deceleration greater than a first predetermined value;

stationary catch means adapted for attachment to the vehicle seat assembly for cooperating with a latch;

a latch pivotally attached to the seat back having a camming portion for camming against the top surface of said catch means when the seat back is tilted back to a relatively vertical position, a latching portion which is received by said catch means when said camming portion cams against the catch means, and an engaging portion which is adapted to engage said roller means when said roller means is in its locking position, said latch being biased about its axis so that said camming portion pushes against the top of said catch means, so that the latching portion is biased away from said catch means, and so that said engaging portion will engage the roller means when it is in its locking position, said latch being adapted so that when the engaging portion engages said roller means the latching portion is prevented from withdrawing from said catch means and engages said catch means so that said seat back is prevented from tilting forward.

8. The latch mechanism defined in claim 7 wherein said latch mechanism includes:
means for maintaining said roller means in the locking position subsequent to a vehicle deceleration greater than a second predetermined value, which value is greater than said first value.

9. The latch mechanism defined in claim 8 wherein said maintaining means comprises a barrier disposed in said roller guide means adapted to block the further upward movement of said roller means during a vehicle deceleration up to said second value so that said roller means can move back to the first position subsequent to said vehicle deceleration, and adapted to allow said roller means to move past said barrier during a vehicle deceleration greater than said second value so that said barrier maintains said roller means in the locking position subsequent to said vehicle deceleration.

10. The latch mechanism defined in claim 8 further including a means for releasing the roller means from the maintaining means so that the roller means can return to the first position allowing tilting of said seat back.

11. An inertia-responsive vehicle seat back latch mechanism for a vehicle seat assembly having a seat cushion support and a seat back pivotally supported for forwardly tilting movement, said latch mechanism comprising:
forwardly-inclined roller guide means attached to the seat cushion support for guiding an unattached inertia-responsive roller means in a restricted path of movement and which roller means is initially in a first position allowing tilting of said seat back;
unattached inertia-responsive roller means contained within said guide means for moving from said first position to a second locking position during a vehicle deceleration greater than a first predetermined value;
a latch integral with the seat back adapted to lockingly engage said roller means in the second locking position to prevent said seat back from tilting forward.

12. The latch mechanism defined in claim 11 wherein said latch mechanism includes:
means for maintaining said roller means in the locking position subsequent to a vehicle deceleration greater than a second predetermined value, which is greater than said first value.

13. The latch mechanism defined in claim 12 wherein said maintaining means comprises a barrier disposed in said roller guide means adapted to block the further upward movement of said roller means during a vehicle deceleration up to said second value so that said roller means can move back to the first position subsequent to said vehicle deceleration, and adapted to allow said roller means to move past said barrier during a vehicle deceleration greater than said second value so that said barrier maintains said roller means in the locking position subsequent to said vehicle deceleration.

14. The latch mechanism defined in claim 12 further including a means for releasing the roller means from the maintaining means so that the roller means can return to the first position allowing tilting of said seat back.

15. An inertia-responsive vehicle seat back latch mechanism for a vehicle seat assembly having a seat cushion support, a seat back pivotally supported for forwarding tilting movement, said latch mechanism comprising:
unattached inertia-responsive roller means for moving between a first tilting position which allows the seat back to be tilted and a second locking position which prevents the seat back from tilting;
roller guide means attached to said seat cushion support for containing and guiding the unattached inertia-responsive roller means for moving between said first tilting position and said second locking position;
camming means integral with said seat back for camming said roller means into the locking position when said seat back is in a relatively vertical position, and for releasing said roller means from said camming action when said seat back is tilted forward; and
means attached to said seat back for engaging said roller means when said roller means is in the locking position so as to prevent the seat back from tilting forward;
wherein said roller means, said unattached inertia-responsive means, said camming means, and said engaging means are adapted so that during a vehicle deceleration less than a first predetermined value the roller means moves to the first position upon release of the camming action of said camming means thus allowing the seat back to be tilted forward, and so that during a vehicle deceleration equal to or greater than said first value, the roller means is inertia-biased to remain in the locking position to be engaged by the engaging means thereby preventing the seat back from tilting forward.

16. The latch mechanism defined in claim 15 wherein said latch mechanism includes:
means for maintaining said roller means in the locking position subsequent to a vehicle deceleration greater than a second predetermined value, which is greater than said first value.

17. The latch mechanism defined in claim 16 wherein said maintaining means comprises a barrier disposed in said roller guide means adapted to block the further upward movement of said roller means during a vehicle deceleration up to said second value, and adapted to allow said roller means to move past said barrier during a vehicle deceleration greater than said second value so that said barrier maintains said roller means in the locking position subsequent to said vehicle deceleration.

18. The latch mechanism defined in claim 16 further including a means for releasing the roller means from the maintaining means so that the roller means can return to its unmaintained position.

* * * * *